June 12, 1923.  1,458,765
J. P. KELLY
BY-PASS VALVE FOR ANGLE COCKS
Filed Jan. 15, 1921
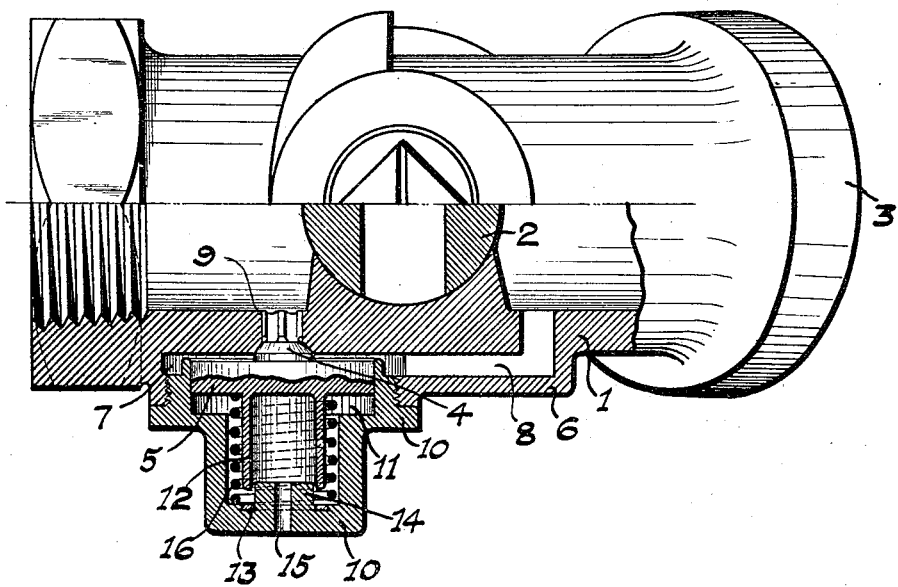
INVENTOR
John P. Kelly
BY
Edward A. Wright
ATTORNEY Patented June 12, 1923.

1,458,765

UNITED STATES PATENT OFFICE.

JOHN P. KELLY, OF PITTSFIELD, MASSACHUSETTS.

BY-PASS VALVE FOR ANGLE COCKS.

Application filed January 15, 1921. Serial No. 437,416.

*To all whom it may concern:*

Be it known that I, JOHN P. KELLY, a citizen of the United States, residing at Pittsfield, in the county of Berkshire and State of Massachusetts, have invented a certain new and useful Improvement in By-Pass Valves for Angle Cocks, of which improvement the following is a specification.

This invention relates to automatic by-pass valve devices for brake pipe angle cocks of railway air brake systems, the object being to provide an improved device of this character which shall operate to normally maintain an open passage around the angle cock when the cars are coupled together with the hose couplings connected and the brake pipe charged with a certain degree of pressure, but which shall operate automatically to close said passage when the hose is uncoupled and the brake pipe disconnected between the cars.

The purpose of this invention is to prevent accidents due to the failure of the air brakes caused by the inadvertent or malicious closing of an angle cock at any point in the brake pipe of the train, and this is accomplished by maintaining an open by-pass around the cock, the passage being of sufficient capacity to permit the free passage of air in either direction to produce the normal operation of the air brake apparatus even if the angle cock is closed. The device, however, is designed to be automatically closed promptly whenever the brake pipe hose is uncoupled, to prevent the escape of air from the brake pipe and an undesired application of the brakes.

In the accompanying drawing, the figure is a view partly in plan and partly in horizontal section, showing an angle cock device embodying my improvement.

According to the construction shown, the angle cock is of the usual type, comprising a cock body, 1, cock key, 2, and the angle end, 3, adapted to be attached to the brake pipe hose at the end of the car in the usual way. The handle for the cock key is omitted from the drawing. According to my improvement, a passage is provided around the cock for establishing communication from the brake pipe at one side of the cock or key to the brake pipe at the other side, and this passage is controlled by a valve, such as 4, connected to a piston, 5, which is exposed on the inner side to the brake pipe pressure at the hose side of the cock.

In the preferred construction, the by-passage is formed directly in the wall of the cock body, and for this purpose the body is cast with a boss, 6, at one side, having a chamber, 7, for the piston, a passage, 8, from said chamber to the brake pipe at the hose side of the cock, and a port, 9, from said chamber to the brake pipe at the inner side of the cock, the latter port being controlled by the valve, 4, closing toward the brake pipe. In the chamber, 7, is secured the cylinder cap, 10, in which is mounted the piston, 5, for operating the valve. The inner face of the piston is exposed to the brake pipe pressure at the hose end of the cock through the passage, 8. According to one feature of my improvement, a portion of the piston at its other side is subject to atmospheric pressure, while another portion is subject to the pressure of a fluid chamber, and such a chamber, 11, may be conveniently formed by providing a hollow cylindrical stem, 12, for the piston, the outer end of which is adapted to seat upon a gasket, 13, and thereby make a tight joint to prevent the leakage of air from the chamber, 11, around the stem. The hollow stem is adapted to slide upon a fixed guide, 14, formed on the cap, and having a small port, 15, for connecting the space within the hollow stem, 12, to the atmosphere. A spring, 16, is mounted between the cap and the piston for closing the valve when the air pressure is released from the hose, and the spring is preferably of sufficient strength to hold the valve closed against a pressure in the brake pipe of about 115 pounds per square inch, acting on the area of the valve, or a pressure higher than that used in the usual braking operations.

When the cars are connected with the hose coupled, the angle cock open, and the brake pipe charged to the usual pressure, the valve, 5, is opened by the brake pipe pressure from the hose end of the cock through the passage, 8, acting on the face of the piston, 5. This pressure on the piston readily overcomes the force of the spring, 16, and moves the piston with its stem out against its seat on the gasket, 13, thus holding the valve open for establishing free communication through the passage around the cock. The air under pressure also leaks around the piston into the chamber, 11, where it acts upon a portion of the outer face of the piston to assist in closing the valve when the hose is uncoupled. If one or more of the angle cocks should then become closed, either accidentally or by malicious design, it will be seen that the by-pass valve will remain open so that air under pressure will flow freely in either direction around the closed cock and the operation of the brakes will not be interrupted, but will extend throughout the train.

When it is desired to uncouple and separate the cars, the angle cocks are closed and the hose is uncoupled in the usual way. Upon the escape of air from the hose to the atmosphere, the pressure on the inner face of piston, 5, is instantly reduced to nearly zero, so that the spring, 16, assisted by the pressure in chamber, 11, acting on the opposite side of the piston will immediately move the same inward and close the valve, 5. This movement follows promptly after the parting of the hose so as to prevent any material escape of air from the brake pipe to cause an application of the brakes. At the rear end of the train, the last angle cock is, of course, closed and as there is no pressure in the hose at the end of the last car where the angle cock is closed, the by-pass valve will also be closed and the spring will hold the valve seated against the pressure of air in the brake pipe.

If one of the angle cocks at the forward end of a car should be inadvertently closed, and the engineer should then make an emergency application of the brakes, and the brake pipe pressure in the hose should be suddenly reduced to such a point that the spring, 16, would close the valve, 5, the engineer may then prevent the valve from closing or promptly reopen the same by increasing the brake pipe pressure a small amount, that is to say about ten or fifteen pounds, which, acting on the face of the piston, is sufficient to compress the spring. It will thus be seen that the by pass valve is, to some extent, under the control of the engineer. Whenever the brake pipe pressure is reduced below the minimum pressure of ten to fifteen pounds per square inch, which, acting upon the face of the piston, is necessary to overcome the force of the spring, 16, the by pass valve will then be closed.

The port, 15, is made of sufficiently small capacity to temporarily hold a reduced air pressure in chamber, 11, as the stem, 12, leaves its seat, 13, in the act of closing the valve, to ensure the prompt and complete closure of said valve, but the port, 15, is also large enough to permit the escape of the air which leaks around the piston, 5, when the valve, 4, is in closed position and the brake pipe is being charged up. This ensures a prompt opening of the by-pass valves as soon as the brake pipe pressure acting on pistons, 5, is sufficient to overcome the springs, 16, when charging the brake pipe.

Having now described my invention, what I claim as new and desire to secure by Letters Patent is:

1. A by-pass valve device for angle cocks, comprising a brake pipe cock, a passage around said cock, for establishing communication from one side of the cock to the other, a valve for controlling said passage, a piston attached to said valve and exposed on one side to the brake pipe pressure at the hose side of the cock, a fluid pressure chamber at the opposite side of the piston, means for sealing said chamber when the piston moves to the open position, and a spring acting to close said valve.

2. A by-pass valve device for angle cocks, comprising a brake pipe cock, a passage around said cock, for establishing communication from one side of the cock to the other, a valve for controlling said passage, a piston attached to said valve and exposed on one side to the brake pipe pressure at the hose side of the cock, a fluid pressure chamber at the opposite side of the piston, a portion of said piston being subject to the pressure of said chamber and another portion subject to atmospheric pressure, and a spring acting to close said valve.

3. A by-pass valve device for angle cocks, comprising a brake pipe cock, a passage around said cock, for establishing communication from one side of the cock to the other, a valve for controlling said passage, a piston attached to said valve and exposed on one side to the brake pipe pressure at the hose side of the cock, a cylindrical stem for the piston, a gasket forming a seat for said stem, a fluid pressure chamber around said stem, and a spring acting to close said valve.

4. A by-pass valve device for angle cocks, comprising a brake pipe cock, a passage around said cock, for establishing communication from one side of the cock to the other, a valve for controlling said passage, a piston attached to said valve and exposed on one side to the brake pipe pressure at the hose side of the cock, a hollow cylindrical stem for the piston, a gasket forming a seat for the stem, a fluid pressure chamber around said stem, a cylindrical guide within said stem, and a spring acting to close said valve.

5. A by-pass valve device for angle cocks, comprising a cock body having a chamber formed in its wall, a passage from said chamber to the hose side of the cock, and a port from said chamber to the brake pipe at the other side of said cock, a cylinder cap member secured in said chamber, a piston in said cylinder cap, a valve connected to the piston for controlling said port, and a spring acting to close said valve.

6. A valve device for brake pipes, comprising a valve, a spring tending to close said valve, a piston connected thereto and exposed on one side to the brake pipe pressure at the hose end of the pipe, and on the opposite side to the pressure of a chamber, and means for sealing said chamber when this valve moves to its open position.

7. A valve device for brake pipes, comprising a valve, a spring tending to close said valve, a piston attached to said valve and subject on one side to the brake pipe pressure at the hose end of the pipe, a chamber at the other side of the piston, means for sealing said chamber when the valve is open, and for venting said chamber to the atmosphere when the valve is closed.

In testimony whereof I have hereunto set my hand.

JOHN P. KELLY.